United States Patent

Bergeron et al.

[15] 3,661,022

[45] May 9, 1972

[54] SHEAVE DRIVE

[72] Inventors: Zoel Bergeron, Valcourt, Quebec; Leo Vadeboncoeur, St. Adolphe D'Howard, Quebec, both of Canada

[73] Assignee: Bombardier Limited, Valcourt, Quebec, Canada

[22] Filed: June 26, 1970

[21] Appl. No.: 50,253

[30] Foreign Application Priority Data

June 23, 1970 Canada....................................86,360

[52] U.S. Cl..........................................................74/230.17
[51] Int. Cl........................................................F16h 55/52
[58] Field of Search........................74/230.17 CC, 230.17 A

[56] References Cited

UNITED STATES PATENTS 3,066,546  12/1962  Thostenson...................74/230.17 CC Primary Examiner—C. J. Husar
Attorney—Larson, Taylor and Hinds

[57] ABSTRACT

A sheave drive which incorporates resilient shims in the radial slots of the sliding disc's hubs where the inner bellcrank arms of the governor are seated. An encircling band is used to retain the shims in place and a shim assembly is taught wherein the shims are integral with the band.

10 Claims, 7 Drawing Figures

PATENTED MAY 9 1972

3,661,022

SHEAVE DRIVE

BACKGROUND OF THE INVENTION

1. Field of the Invention

Sheave transmissions have become increasingly popular with the advent of snowmobiles, and in recent years they have been coupled to relatively powerful engines, sometimes reaching as much as 100 hp. Their primary function is to provide clutching means at idle speeds and act in a manner similar to a torque converter when the engine exceeds a predetermined minimum speed of rotation.

In a typical embodiment, the drive sheave is mounted on the output shaft of the engine while the driven sheave which is supported on the frame of the vehicle in substantial alignment with the drive sheave is in constant driving engagement with the ground engaging wheels or the endless track driving sprockets of the vehicle. Each sheave has a first frusto-conical disc secured to a shaft, a second frusto-conical disc facing the first one and slidably supported on the same shaft, and static resilient means urging the discs of the drive sheave apart from one another and urging the discs of the driven sheave towards the closed position such that at rest or at idle speed the drive belt remains on the periphery of the driven sheave and sits in the bottom of the V-shaped formation defined by the discs of the drive sheave. A centrifugal governor is provided on the output shaft of the engine which operates, as the speed of the engine exceeds a prescribed maximum idle speed, in such a manner as to move the second disc of the drive sheave closer to the first disc thereof. As a result, the drive belt while turning the driven sheave is forced to progress towards the periphery of the drive sheave and work down the V-shaped formation of the driven sheave hence varying the ratio of angular rotation of the driven shaft in relation to the engine's output shaft.

2. Description of the Prior Art

The most popular type of governor used in sheave drives incorporates a plurality of bellcranks equidistant from one another and from the axis of rotation of the drive shaft and pivoted on a rotatable support for radial rocking motion. The bellcranks have one end seated in a U-shaped radial slot provided on the hub that mounts the second disc on the drive shaft, and upon pivoting of the bellcranks the hub is moved along the drive shaft.

Such governors are relatively simple in construction and with adequate lubrication they can provide smooth clutching and torque converting action. However in spite of close tolerances in the U-shaped radial slots of the hub and the use of hardened steel components, vibrations of the bellcranks at idle speeds soon develop to further the play at the various wear surfaces and generate objectionable noises.

Numerous attempts have been made to eliminate this difficulty but invariably the resulting construction lacked the simplicity of the above noted design. One such construction can be found in Canadian Pat. No. 831,740 issued Jan. 13, 1970 to Leon Beaudoin for an invention entitled: Variable Pitch Pulley.

SUMMARY OF THE INVENTION

According to this invention a resilient shim for each bellcrank is disposed between a wall of the U-shaped radial slot of the hub and the adjacent surface of the actuating finger of the associated bellcrank, urging same towards the opposite wall of the slot. The shim when made of a thin prestressed spring steel element seated in the slots of the hub can also obviate the need for hardened wear surfaces in the area where the bellcranks meet the hub. Furthermore, to facilitate assembly and prevent unwanted displacement of the shims within the radial slots of the hub it was found particularly advantageous to adopt a one piece shim assembly comprising a circular band with integral radial fingers of U-shaped cross-section projecting inwardly such that with the band encircling the hub each finger can rest within one of the radial slots. Such a shim assembly can be produced from a thin walled spring steel cylindrical blank whose upper portion depending from a ring portion consists of a number of arcuate elements corresponding to the number of bellcranks, each element having a central region interconnecting the element to the ring portion, and two similar winglike portions. The assembly is made by folding the winglike portions outwardly through about 90° then folding the central regions inwardly of the ring portion through about 90°. An easier to make construction consists of a ring member encircling the hub and discrete spring steel shims each retained into position by means of an integral tab.

BRIEF DESCRIPTION OF THE DRAWINGS

Before a detailed consideration of illustrated embodiments of the invention it may be useful to briefly comment on the principle of operation of sheave transmissions in reference to FIGS. 1A and 1B and 2. A drive sheave "D" is mounted on a drive shaft "S" directly coupled to a source of power (not shown). Driven sheave "d", rotatable with respect to the vehicle chassis (not shown), operates driven shaft "s" while a drive belt "DB" couples sheaves "D" and "d". In FIG. 1A the drive sheave "D" is in the "fully open" condition, and the distance between the faces of its frusto-conical discs is sufficient to completely disengage the drive belt "DB". Shaft "S" and sheave "D" can therefore rotate freely while driven sheave "d" remains stationary with belt "DB"; thus creating a neutral drive condition. In FIG. 1B, the rotating slidable (lower) disc of drive sheave "D" has moved along drive shaft "S" toward the fixed (upper) disc thereby wedging drive belt "DB" between the faces of the discs and forcing same radially outwardly from the axis of rotation of shaft "S". At the other end, drive belt "DB", while rotating driven sheave "d", was simultaneously pulled towards the bottom of the V-shaped formation defined by the frusto-conical discs thereof. As the drive pulley "D" can be made to assume any intermediate position of full engagement, it can be seen that this arrangement constitutes an infinitely variable ratio transmission system.

FIG. 2 illustrates, with elements broken away, a typical sheave drive "D" as presently used on snowmobiles and other small motorized vehicles. Sheave drive "D" is mounted on drive shaft "S" which is constituted by a tubular sleeve 10 threaded at both ends and screwed onto the motor output shaft. A first frusto-conical disc 12 is secured to sleeve 10 such as by welding, and the combination of a ball bearing 14 for carrying the belt in neutral, a thrust plate 16 against bearing 14, and a compression coil spring 18 seated at its inner end in thrust plate 16 are coaxially mounted on sleeve 10 against the base of disc 12. At the upper end of sleeve 10, a cylindrical hub 20 supports a second frusto-conical disc 22 in sliding engagement with sleeve 10 and houses the upper portion of coil spring 18 while governor 24 is secured to sleeve 10 by means of a cap screw 26 and a washer 28.

Figure 1A:
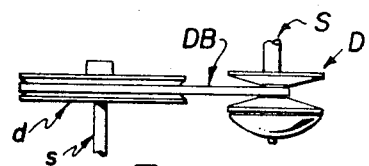
FIGS. 1A and 1B are simplified top views of a sheave transmission illustrating the relative conditions of the sheaves at two different modes of operation, respectively.
Figure 1B:
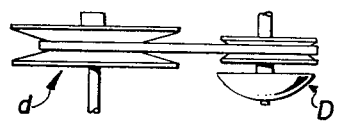
Figure 2:
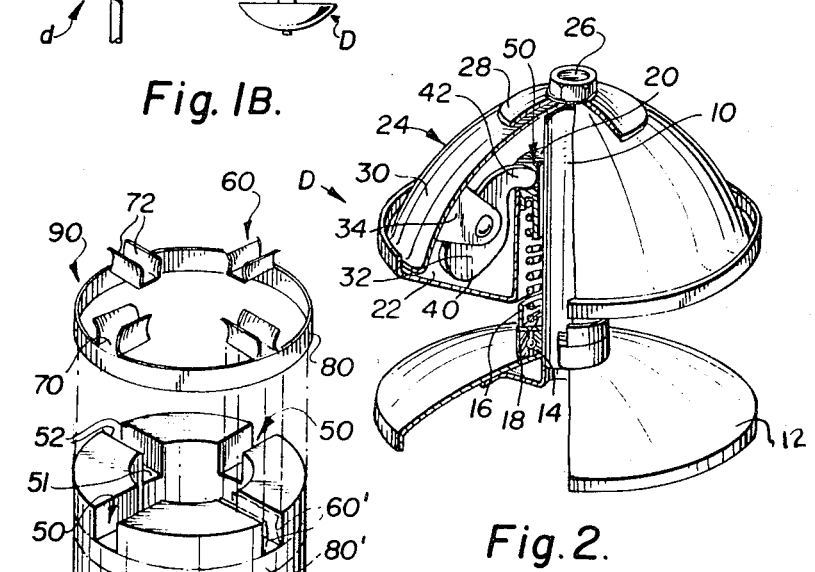
FIG. 2 is a partly broken perspective view of a sheave drive using a bellcrank actuated governor.

Governor 24 consists of a bell housing or support 30 and a plurality of bellcranks 32 (only one been shown in FIG. 2) equidistant from one another and from the axis of sleeve 10, and pivoted to support 30 by means of radial lugs 34 welded or otherwise attached to support 30. Hence bellcranks 32 are pivoted for rocking motion in a plane that includes the axis of sleeve 10, and where four such bellcranks are used, they are spaced in a circle 90° from one another. Each bellcrank 32 has a heavy portion 40 adapted to react to rotation of support 30 by swinging outwardly. The opposite end 42 of each bellcrank 32 constitutes an actuating finger seated in one of an equal number of equidistant U-shaped radial slots 50 (better shown in FIG. 3) provided at the outer end of hub 20. It will be seen that at rest, coil spring 18 urges hub 20 away from disc 12 thereby maintaining the pulley in the fully open condition; but as the speed of rotation of sheave drive "D" increases, bellcranks 32 pivot in such a manner that their actuating fingers 42 cooperatively urge hub 20 and the depending disc 22 towards the first, fixed disc 12 against the action of spring 18.

In the illustrated sheave drive "D", bellcranks 32 also serve to drive into rotation slidable disc 22 by virtue of engagement of the sides of fingers 42 with the parallel walls of the U-shaped slots 50 but other keying means between sleeve 10 and hub 20 such as axial splines can be resorted to.

DESCRIPTION OF PREFERRED EMBODIMENTS

Figure 3:
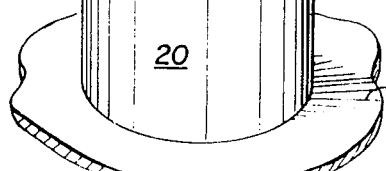
FIG. 3 is a perspective view of a shim assembly and the hub portion of a sheave disc.
Figures 5, 6:
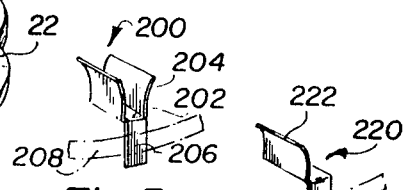
FIGS. 5 and 6 are perspective views of a shim members.

In accordance with this invention, a thin resilient shim element preferably non-planar held in position in each radial slot 50 of hub 20 in order to maintain actuating fingers 42 of bellcranks 32 in constant engagement with the parallel walls of slots 50 by urging fingers 42 in a direction parallel to the pivoted axis of the bellcrank. FIGS. 3, 5 and 6 illustrate different shims that can be used for this purpose.

In FIG. 3, hub 20 is reproduced with the inner region of its depending disc 22. Thereabove is shown shim means 90 having a series of four shim members 60, each consisting of a base portion 70 and a pair of laterally spaced arcuate wings 72 upstanding from opposite sides of base 70, as can be obtained by folding a thin spring steel strip or sheet element at right angle into a U-shaped configuration. Each base portion 70 is adapted to rest against the bottom surface 51 of one of slots 50 and wing portions 72 are designed to contact walls 52 of slot 50 and the side faces of the associated actuating finger 42. For locating and maintaining shims 60 into slots 50 (as seen at 60'), and inextensible ring 80 is used with which base portion 70 can be integrally formed. Ring 80 is adapted to encircle and snugly fit around the intermediate region of hub 20 as indicated in dotted lines 80'. Hence, shim assembly 90 presents itself as a circular band 80 with integral radial fingers 60 of U-shaped cross-section projecting inwardly of band 80.

In assembled form, hub 20 is mounted on sleeve 10 with shim assembly 90 in the position illustrated at 80'. Support 30 is then secured to sleeve 10 with each bellcrank 32 suitably aligned with its corresponding slot 50. However due to the presence of shims 60 in slots 50, the protruding finger of each bellcrank 32 is wedged into engagement with upstanding walls 72. As illustrated in FIG. 3, walls 72 can be made slightly arcuate to ensure constant engagement with the side faces of bellcrank fingers 42 and with the walls of slots 50.

Figure 4:
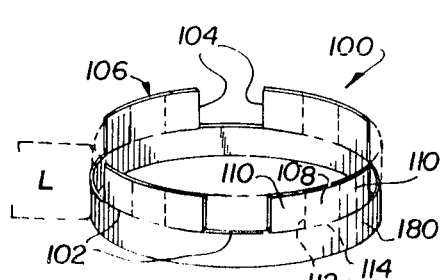
FIG. 4 is a perspective view of a shim assembly blank.

Shim assembly 90 can be produced from a thin walled cylindrical blank 100 (see FIG. 4) cut from a tube made of resilient, wear resistant metal, preferably spring steel. It's length "L" corresponds to the length of shims 60 plus the height of band 80, and its inside diameter should be just sufficient to closely fit around hub 20. The lower region 180 of blank 100 forms the encircling band 80. The depending radial fingers 60 can be obtained by first cutting blank 100 along four arcuate lines 102 and eight axial lines 104 to provide four arcuate elements 106, each with a central region 108 and two winglike portions 110. Winglike portions 110 are then folded outwardly along dotted lines 112 through about 90° and finally central region 108 is folded inwardly of ring 180 along line 114 through an angle of 90°.

Shim means or assembly 90 can also be made from a flat blank (not shown) formed into a closed loop for example by riveting or other fastening means, preferably after the cutting and folding operations.

Furthermore, where tooling for the production of assembly 90 is not readily available, discrete shim elements with an axial tab can be used in combination with an inextensible tight fitting ring encircling hub 20 and the tabs therearound creating frictional engagement of the mating surfaces. FIG. 5 shows a discrete shim element 200 comprising a base 202, two upstanding arcuate walls 204, and an axial tab 206 extending at right angle from base 202. Dotted lines 208 represent the encircling band. In FIG. 6 a similar shim element 220 is shown which has only one upstanding wall 222 as may be sufficient where the play between the bellcrank fingers and the slot is relatively small.

It has been found that the use of spring steel shims in accordance with the invention greatly reduces wear and can obviate the need for hardened metal components in the areas where the bellcranks contact the hub.

We claim:

1. In a sheave drive comprising a rotatable shaft, a first frusto-conical disc rigidly supported onto said shaft, a second frusto-conical disc capable of axial displacement along said shaft towards and away from said first disc thereby to cooperatively define a V-shaped formation of variable width, said second disc having a hub portion concentrical with said drive shaft extending away from said V-shaped formation to define near its extremity a plurality of equidistant radial slots each defined laterally by parallel spaced-apart walls, and governor means rotatable with said drive shaft and having a plurality of bellcranks equidistant from one another and from the axis of rotation of said drive shaft, each of said bellcranks being pivoted intermediate its ends for rocking motion in a plane that includes said axis of rotation and having one end received in one of said radial slots; the improvement comprising a resilient shim for each of said bellcranks disposed between at least one of said walls and the adjacent surface of the associated bellcrank and urging same towards the other of said walls.

2. The improvement defined in claim 1 wherein said resilient shim is formed of a thin spring steel sheet element folded at right angle and defining a base portion adapted to rest against the bottom surface of one of said radial slots, and an upstanding wing adapted to contact one of said walls of the last-mentioned radial slot and a side face of the associated one of said bellcranks.

3. The improvement defined in claim 1 wherein said resilient shim consists of a U-shaped spring steel sheet element seated in one of said radial slots and defining a base portion and a pair of laterally spaced arcuate wings upstanding from said base portion, said U-shaped element being adapted to receive between its said wings said one end of the associated bellcrank.

4. The improvement defined in claim 2 wherein said shims are mounted onto said hub portion and secured thereto by means of an inextensible ring encircling said hub portion.

5. The improvement defined in claim 3 wherein said shims are mounted onto said hub portion and secured thereto by means of an inextensible ring encircling said hub portion.

6. The improvement defined in claim 4 wherein each one of said shims has a tab portion extending at right angle from said base portion and adapted to be disposed between said inextensible ring and the underlaying region of said hub; said ring being dimensioned such as to create frictional engagement of said tabs with said hub portion.

7. Shim means for use in a drive sheave to prevent vibration of pivotally mounted centrifugal bellcranks, comprising a ring and a plurality of depending radial shim elements each comprising a non-planar thin strip of spring steel adapted to maintain constant contact with a region of one of said bellcranks and urge same in a direction parallel to the pivotal axis of said last-mentioned bellcrank.

8. Shim means as defined in claim 7 wherein each one of said shim elements is of U-shaped cross-section with a base portion and a pair of spaced-apart arcuate wings adapted to receive therein one end of one of said bellcranks.

9. Shim means as defined in claim 8 wherein said shim elements are integral with said ring and project radially inwardly thereof.

10. Shim means as defined in claim 9 produced from a cylindrical blank of which one end defined said ring while the other end is cut and folded in such a manner as to provide said base portions integral with said ring and equally spaced-apart along the periphery of said ring and said pairs of arcuate wings upstanding from opposite sides of said base portions.

* * * * *